United States Patent [19]
Akamatsu et al.

[11] Patent Number: 5,942,880
[45] Date of Patent: Aug. 24, 1999

[54] COMPENSATION CONTROL DEVICE FOR A POWER SYSTEM

[75] Inventors: Masahiko Akamatsu; Shotaro Murakami; Yasuhiko Hosokawa, all of Tokyo, Japan

[73] Assignee: Mitsubishi Denki Kabushiki Kaisha, Tokyo, Japan

[21] Appl. No.: 09/149,097

[22] Filed: Sep. 8, 1998

[30] Foreign Application Priority Data

Jan. 20, 1998  [JP]  Japan .................................. 10-008893

[51] Int. Cl.⁶ ............................................................ G05F 1/70
[52] U.S. Cl. .......................................... 323/210; 323/207
[58] Field of Search ..................................... 323/210, 211, 323/213, 209, 207, 208; 363/16, 40, 39; 307/151, 85

[56] References Cited

U.S. PATENT DOCUMENTS

| | | | |
|---|---|---|---|
| 5,198,746 | 3/1993 | Gyugi et al. | 323/207 |
| 5,343,139 | 8/1994 | Gyugyi et al. | 323/207 |
| 5,351,181 | 9/1994 | Brennen et al. | 363/71 |
| 5,646,511 | 7/1997 | Akamatsu et al. | 323/207 |

OTHER PUBLICATIONS

Kinney et al., "Slatt Thyristor Controlled Series Capacitor System Test Results", CIGRE Symposium Tokyo, 1995, pp. 1–6.

*Primary Examiner*—Peter S. Wong
*Assistant Examiner*—Rajnikant B. Patel
*Attorney, Agent, or Firm*—Leydig, Voit & Mayer, Ltd.

[57] ABSTRACT

A compensation control device for a power system includes a switched capacitor connected in series with a transmission line, a voltage applying control connected in series with the transmission line, and a ganged control for controlling on/off operation of the switched capacitor and a linearizing voltage generated by the voltage applying control. The control ensures that a sum voltage of a stepped voltage generated across the switched capacitor and the linearizing voltage produced by the voltage applying control and that is applied to the transmission line is continuous. The control device realizes controllability of the total impedance of the transmission line and reduces the capacitance of the parts employed in the ganged control.

15 Claims, 9 Drawing Sheets

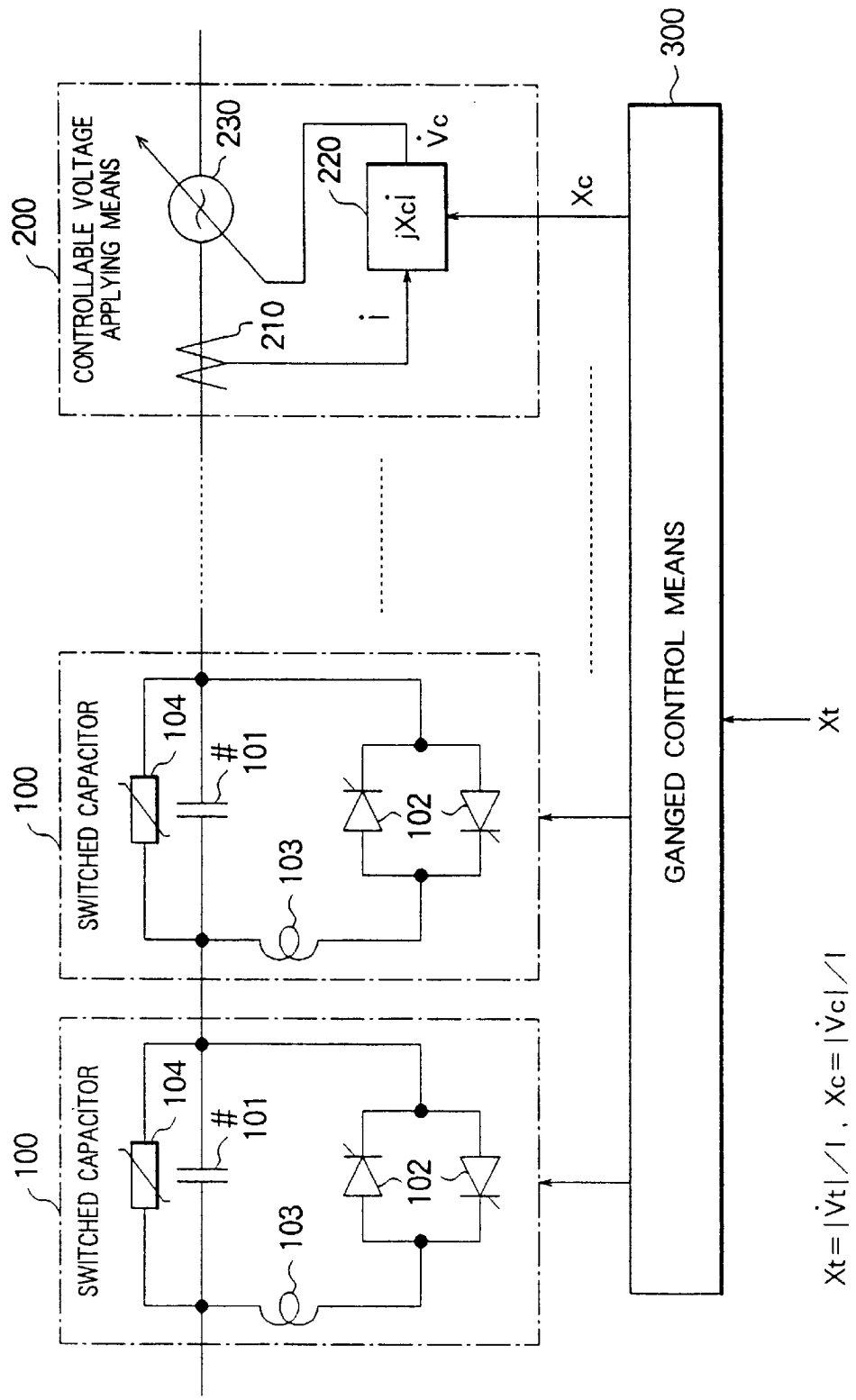

THYRISTOR ENERGIZATION ANGLE

COMPENSATION CONTROL DEVICE FOR A POWER SYSTEM

BACKGROUND OF THE INVENTION

1. Field of the Invention

The present invention relates to an improvement in a compensation control device for a power system that compensates the reactance of the power system, controls the reactance, controls an eddy current or controls stabilization.

2. Description of the Related Art

A conventional compensation control device for a power system will be described with reference to FIGS. 8A and 8B. FIG. 8A is a diagram showing the conventional compensation control device for a power system having a switched capacitor disclosed in Article No. 530-02 reported in CIGRE symposium relating to the power field in Tokyo on May 22 to 24, 1995. FIG. 8B is a diagram of a CSC (controlled series compensator) disclosed in Article No. 210-06 reported in that symposium.

In FIG. 1 of the former article, there is shown a plurality of switched capacitors, each of which is turned on/off by thyristor switches which are disposed for switching a capacitive reactance that influences a line current. The swithes turn on/off a plurality of capacitors connected in series and employ thyristor switches connected in parallel with those capacitors, respectively.

In FIG. 4, 3-1 of the latter article, there is shown a CSC in which a fixed series capacitors and a reactor which is thyristor-controlled. The capacitors are connected in parallel to sequentially control the energization angle of the thyristor, thereby sequentially controlling the composite reactance with the capacitors.

In FIG. 8A of this disclosure, each of switched capacitors 100 includes a capacitor 101, a thyristor switch 102, a capacitor short-circuit current limit reactor 103, and an arrester 104. Also, as shown in FIG. 8B, a CSC 500 includes a fixed capacitor 501, an energization angle controlling thyristor 502, an energization angle controlled reactor 503 and an arrester 504.

The switched capacitor 100 allows a capacitive reactance to be changed step by step, and the CSC 500 allows the capacitive reactance to be continuously changed. The combination of them allows a total capacitive reactance to be continuously changed. This variable reactance function makes it possible to realize impedance compensation of a transmission line, reactive power compensation due to a series compensation, and their control. Also, those controls make it possible to conduct the stabilization control of a power system, the adjustment of an eddy current, the adjustment of a line impedance, the adjustment of phase difference between both ends, etc.

However, the CSC 500 that realizes the continuous control function suffers from problems stated below. In a state where the capacitive reactance of the CSC 500 is the smallest, the thyristor 502 is non-energized. A circuit diagram in this state is shown in FIG. 9A.

The capacitive reactance of the CSC 500 in this state becomes a fixed value Xco of the capacitor 501, and the entire line current I flows in the fixed capacitor 501 whereas no current flows in the thyristor 502 and the reactor 503.

Then, the energization angle of the thyristor 502 is increased so that the reactor current flows. Since the reactor current is opposite in phase to the current flowing in the capacitor 501, when the polarity of the reactor current is reversed, the fundamental wave component of the reactor current is identical in phase with the line current, and a sum of the reactor current and the line current flows in the capacitor 501, to thereby raise a voltage across the capacitor 501.

In other words, the susceptance of the thyristor-controlled reactor 503 is canceled by the susceptance of the capacitor 501, to thereby increase the composite capacitive reactance.

As a result, a relation between an energization angle $\alpha$ of the thyristor 502 and the composite capacitive reactance Xc is varied as represented by a curve of FIG. 9C. If the maximum energization angle is 180°, the composite capacitive reactance Xc becomes KXco. That is, the reactance Xc becomes K times as large as the minimum value. A circuit in this state is shown in FIG. 9B. In this case, $KXco=1/\{(1/Xco)-(1/X_L)\}$ is satisfied, where $X_L$ is the reactance of the reactor 503.

Therefore, the reactance of the reactor 503 required for controlling the capacitive reactance in a range of Xco to KXco becomes $X_L=KXco/(K-1)$.

In the conventional compensation control device for a power system, in the above state, the voltage of the capacitor 501 in the CSC 500 becomes K times, and the VA capacitance of the capacitor 501 becomes $K^2$ times, as large as the VA capacitance Qco in a state shown in FIG. 9A. Also, the VA capacitance of the reactor 503 becomes (K−1) KQco. However, since the composite capacitive reactance is KXco, the composite capacitive reactive power is only KQco. In other words, because the reactive power effectively exerted on the line is increased K times, there arises a problem that a capacitor 501 of $K^2$ times and a reactor 503 of K(K−1) times are necessary.

SUMMARY OF THE INVENTION

The present invention has been made to solve the above problems, and therefore an object of the present invention is to provide a compensation control device for a power system which is capable of realizing continuous controllability using a switched capacitor and also reducing the capacitance of parts required for continuous control.

According to the present invention, there is provided a compensation control device for a power system, comprising a switched capacitor inserted in series to a transmission line; controllable voltage applying means inserted in series to the transmission line; and ganged control means for controlling the on/off operation of the switched capacitor, and controlling a voltage generated by the controllable voltage applying means in the manner of linearization in association with the control of the on/off operation of the switched capacitor so that a sum voltage of a stepped voltage across the switched capacitor and the lenearized voltage of the controllable voltage applying means becomes continuous.

Also, in the compensation control device for a power system according to the present invention, the controllable voltage applying means includes: detecting means for detecting a current vector of the transmission line; control means for generating a voltage command orthogonal to the current vector on the basis of a desired reactance; and a controllable power supply for generating a voltage in proportion to the voltage command dependently.

Further, in the compensation control device for a power system according to the present invention, the controllable voltage applying means includes: detecting means for detecting a current vector of the transmission line; control means for generating a voltage command orthogonal to the current vector on the basis of a desired voltage; and a controllable power supply for generating a voltage in proportion to the voltage command dependently.

Still further, in the compensation control device for a power system according to the present invention, the controllable power supply includes: a voltage transformer for detecting a voltage across the transmission line; and a phase detector for detecting a phase of the voltage detected by the voltage transformer; and the detecting means includes: a current transformer for detecting a current in the transmission line; and a coordinate convertor for converting the current vector of a fixed coordinate value detected by said current transformer into a current vector of a synchronously rotating coordinate value.

Yet still further, in the compensation control device for a power system according to the present invention, the controllable power supply further includes: phase command means for arithmetically operating a deviation angle of said voltage command to output the deviation angle; an adder for adding or subtracting said deviation angle to the detection phase of said phase detector to control the generation phase of the a.c. voltage of said controllable power supply; a d.c. voltage command means for arithmetically operating an absolute value of said voltage command to control the absolute value of the a.c. voltage of said controllable power supply; an adjustable d.c. power supply of which d.c. voltage being controlled by the basis of the absolute value of said voltage command; and an amplitude modulation type power convertor which applied an a.c. voltage generated on the basis of the output of the adder and the output of the d.c. voltage adjustor to the transmission line through a transformer.

Yet still further, in the compensation control device for a power system according to the present invention, the controllable power supply includes a DC/AC power convertor and further comprises: d.c. voltage control means for controlling the d.c. voltage of said DC/AC power convertor by finely adjusting the phase of the a.c. voltage of said DC/AC power convertor on the basis of the comparison of the d.c. voltage of said DC/AC power convertor with its command value; converting means for generating a second voltage command on the basis of the voltage command of said control means and the deviation angle obtained from said d.c. voltage control means and for generating a three-phase a.c. voltage command on the basis of the detection phase of said phase detector and the second voltage command of said vector rotating means; and pulse width modulation type power convertor that applies the a.c. voltage generated on the basis of the three-phase a.c. voltage command of the coordinate converting means to the transmission line through the transformer.

Yet still further, in the compensation control device for a power system according to the present invention, the controllable power supply includes an asymchronous rotating machine with wounded rotor, said wound type asymchronous rotating machine applies the a.c. voltage generated so as to be controlled on the basis of said control means into said transmission line.

According to the present invention, there is provided a compensation control device for a power system, comprising: a switched capacitor inserted in series to a transmission line; a switched reactor inserted in series to the transmission line; controllable voltage applying means inserted in series to the transmission line; and ganged control means for controlling the on/off operation of the switched capacitor and the switched reactor, and controlling a voltage generated by the controllable voltage applying means in the manner of lenearization in association with the control of the on/off operation of the switched capacitor and the switched reactor so that a sum voltage of a stepped voltage across the switched capacitor and the switched reactor and the lenearized voltage of the controllable voltage applying means becomes continuous.

The above and other objects and features of the present invention will be more apparent from the following description taken in conjunction with the accompanying drawings.

BRIEF DESCRIPTION OF THE DRAWINGS

In the drawings:

FIG. 1 is a diagram showing the structure of a compensation control device for a power system according to a first embodiment of the present invention;

DETAILED DESCRIPTION OF THE PREFERRED EMBODIMENTS

Now, a description will be given in more detail of preferred embodiments of the present invention with reference to the accompanying drawings.

(First Embodiment)

Figure 2A:
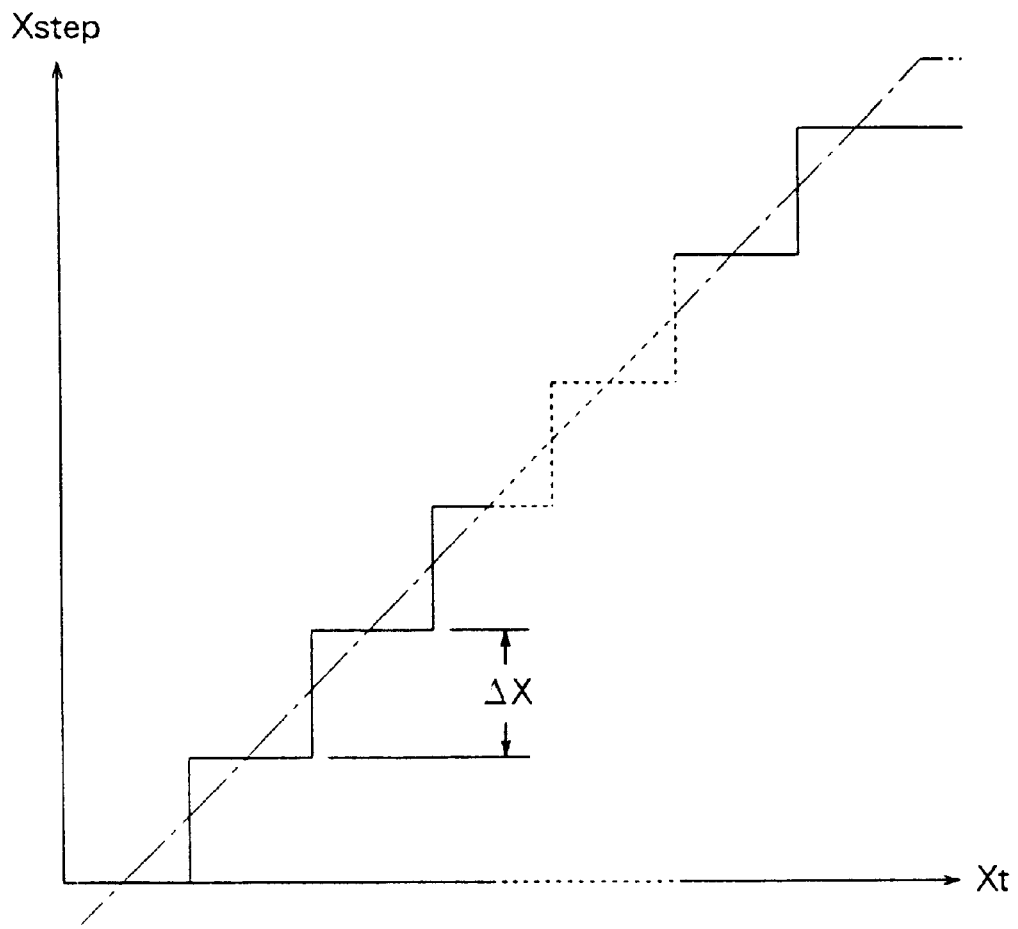
FIGS. 2A and 2B are diagrams showing a relation between a capacitive reactance Xstep and a desired total capacitive reactance Xt in the compensation control device for a power system according to the first embodiment of the present invention, and a relation between a controllable capacitive reactance Xc and a total capacitive reactance Xt in the controlling device, respectively.
Figure 2B:
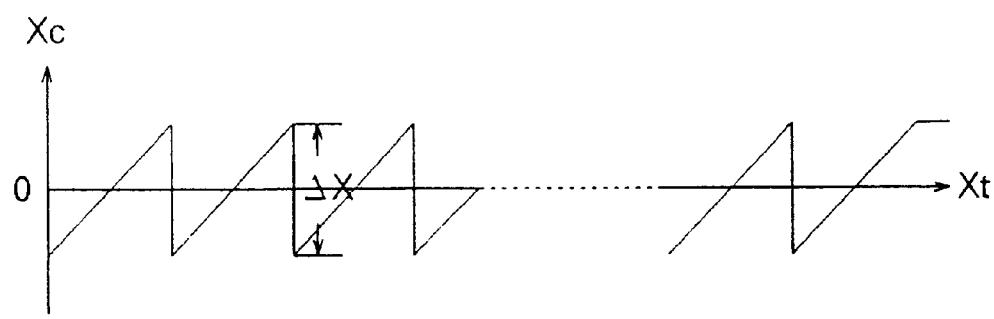
Figure 3:
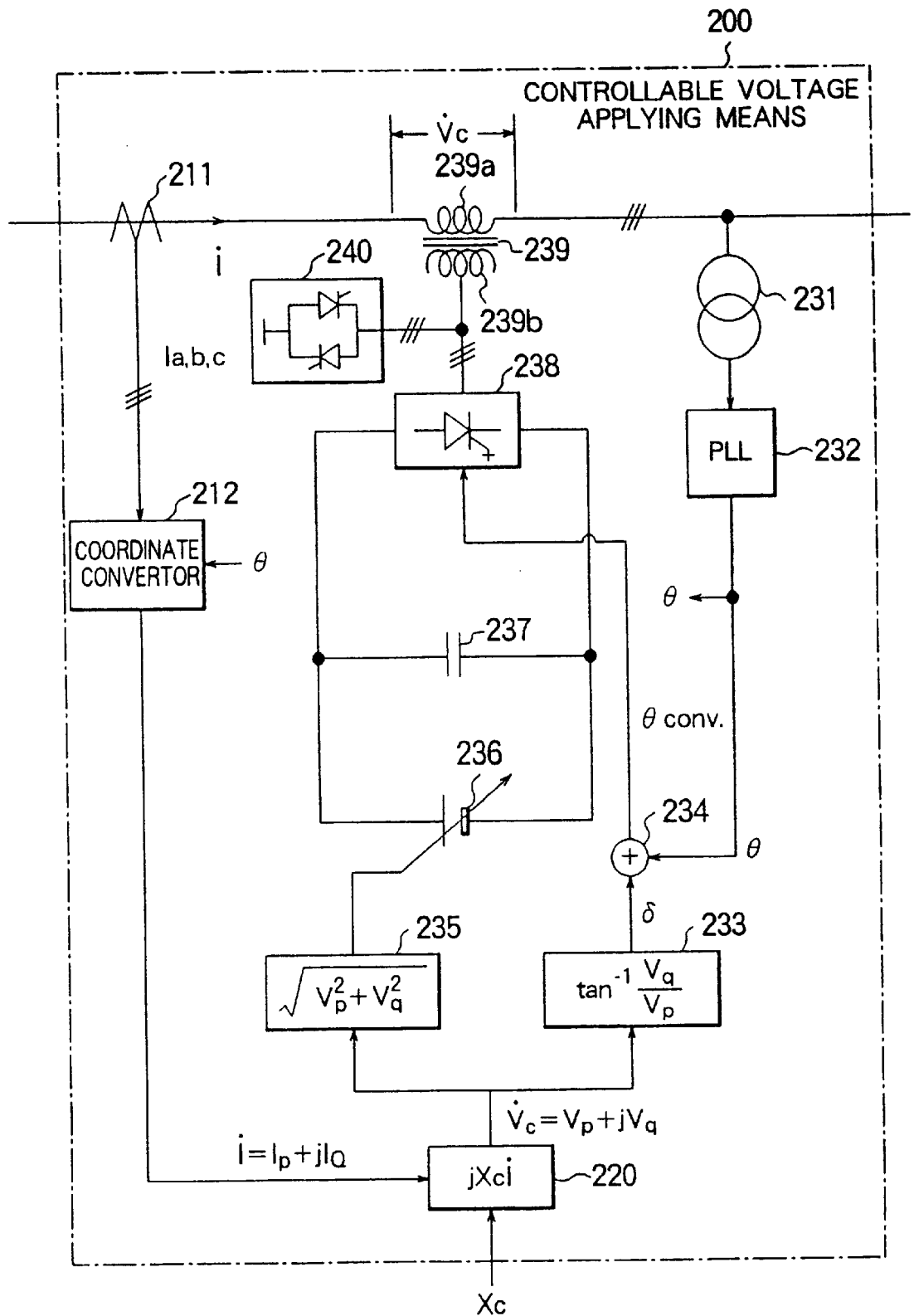
FIG. 3 is a diagram showing the structure of controllable voltage applying means in the compensation control device for a power system according to the first embodiment of the present invention.

A compensation control device for a power system according to a first embodiment of the present invention will be described with reference to FIGS. 1, 2A, 2B and 3. FIG. 1 is a diagram showing the structure of a compensation control device for a power system according to a first embodiment of the present invention. Also, FIG. 3 is a diagram showing a detailed structure of controllable voltage applying means in the compensation control device for a power system according to the first embodiment of the present invention. In the respective drawings, the same reference symbols indicate identical or like parts.

In FIG. 1, reference numeral 100 denotes a switched capacitor; 200 is controllable voltage applying means; and 300 is ganged control means.

Also, in the figure, the controllable voltage applying means 200 includes detecting means 210 for detecting a current vector of a transmission line; control means 220 for generating a voltage vector orthogonal to the current vector; and a controllable power supply 230 which is a slave-controlled power supply for a static power convertor, a wound type a.c. machine, etc.

In FIG. 3, reference numeral 211 denotes a current transformer, and 212 is a coordinate convertor that converts a fixed coordinate value into a synchronous rotation coordinate value. Also, reference numeral 220 is control means for generating a voltage vector.

In addition, in the figure, reference numeral 231 denotes a voltage transformer; 232 is a phase detector (PLL: phase locked loop); 233 is a phase command means for commanding the phase of a generated a.c. voltage; and 234 is an adder. Further, reference numeral 235 denotes a d.c. voltage command means; 236 is a d.c. voltage adjustor; 237 is a d.c. capacitor; 238 is an amplitude modulation (PAM) type power convertor which is a multi-phase static type power convertor; 239 is a transformer consisting of a primary winding 239a and a secondary winding 239b; and 240 is a thyristor switch.

The operation of the first embodiment will be described with reference to FIGS. 2A and 2B. FIGS. 2A and 2B are diagrams showing a relation between a capacitive reactance Xstep and a desired total capacitive reactance Xt in the compensation control device for a power system according to the first embodiment of the present invention, and a relation between a controllable capacitive reactance Xc and a total capacitive reactance Xt in the controlling device, respectively. The switched capacitor 100 permits the on/off operation of the capacitor 101 to be controlled by the thyristor switch 102 as in the conventional device.

In the controllable voltage applying means 200, the detecting means 210 outputs a current vector I and, upon receiving this output current vector I, the control means 220 outputs a voltage command Vc orthogonal to the current vector I. In this situation, assuming that a desired controllable capacitive reactance is Xc, the voltage command Vc can be determined by orthogonal arithmetic operation Vc=jXcI. I and Vc are vector values.

The controllable power supply 230 generates a voltage proportional to the above voltage command Vc. As a result, an equivalent impedance obtained by dividing the voltage command Vc of the control means 220 by the current I can be set to Xc. In addition, the value Xc can be commanded arbitrarily over positive and negative values.

The reactances of the single or plural switched capacitors 100 are varied step by step by the on/off operation of the thyristor switch 102, wherein the ganged control means 300 controls the total capacitive reactance so that it is continuous.

These relations are shown in FIGS. 2A and 2B. FIG. 2A shows a relation between a capacitive reactance Xstep obtained by the on/off operation of the switched capacitor 100 and the desired total capacitive reactance Xt. In other words, if all of the switched capacitors 100 are turned on, the capacitive reactance Xstep becomes 0, and if only the first-stage switched capacitor 100 is turned off, the capacitive reactance Xstep rises only one step.

On the other hand, FIG. 2B shows a relation between the controllable capacitive reactance Xc and a total capacitive reactance Xt. The ganged control means 300 makes the controllable capacitive reactance Xc change in the form of saw-tooth on positive and negative sides, and when the capacitive reactance Xstep is changed in the form of a step, the ganged control means 300 makes the controllable capacitive reactance Xc change only the same step width ΔX so as to be opposite in a changing direction. That is, a sum of a value of a step-like solid line of FIG. 2A and a saw-tooth shaped change value of FIG. 2B is made continuous as indicated by a dashed line in FIG. 2A. The control of the thyristor switch of the switched capacitor 100 can be realized by a plurality of comparators different in actuation level and the composite reactance Xstep can be changed in the form of steps. Also, the command of the controllable capacitive reactance Xc can be realized by a saw-tooth shape function generator. As this example, if a difference between a step function represented by a sum of the above plural comparator outputs and the command Xt is taken, a saw-tooth shape function is obtained.

Through the above method, in response to the command of the total capacitive reactance Xt, the ganged control means 300 determines the on/off operation of the switched capacitor group, and also determines the controllable capacitive reactance Xc for ganged control, to thereby realize the continuously changing total capacitive reactance Xt. Further, the amplitude of the controllable capacitive reactance Xc necessary for continuously changing the total capacitive reactance Xt is only ½ of the step width ΔX of the switched capacitor 100. Since a product of $I^2$ and ΔX is the VA capacitance Qco, whereas a voltage applied to Xc/2 is Vco/2, the VA capacitance of the controllable power supply 230 is only Qco/2. In other words, there is an effect that the VA capacitance of the device necessary for realizing the continuous controllability can be reduced remarkably in comparison with the conventional example describe above.

The detailed operation of the controllable voltage applying means 200 will be described with respect to FIG. 3. When an over-current flows in the line when the power system is in failure, the thyristor switch 240 is rendered conductive to prevent the over-current from entering the power convertor 238.

The coordinate convertor 212 detects a current vector I=(Ip, Iq) according to the three-phase current Ia, Ib, and Ic detected by the current transformer 211, and the phase θ is detected by the phase detector 232. The control means 220 arithmetically applies an operation jXcI according to the controllable capacitive reactance xc and the current vector I to output a voltage command Vc=(Vp, Vq).

The d.c. voltage command means 235 calculates an absolute value of the voltage-command Vc (a square root of the sum of the respective squares of Vp and Vq) to command the d.c. voltage adjustor 236. The d.c. voltage adjustor 236 controls the d.c. voltage of the power convertor 238 and the amplitude of the a.c. output voltage.

On the other hand, the phase command means 233 calculates a deviation angle δ of the voltage command vector Vc (inverse tangent of (Vq/Vp)) and outputs it. The adder 234 adds the deviation angle δ to the reference phase θ detected by the phase detector 232 to determine the phase, θ conv., of the a.c. voltage to be generated by the power convertor 238.

The power convertor 238 operates under a d.c. voltage adjusted by the above d.c. voltage adjustor 236, and operates such that its phase becomes θ conv. That is, an a.c. voltage is outputted according to an intended voltage command vector Vc. This a.c. voltage is applied to the transmission line through the transformer 239.

In this way, the function of the controllable voltage applying means 200 is realized. In other words, it is proper for realizing the operation and effect of FIG. 1. The amplitude modulation type (PAM system) power convertor 238 makes it possible to lower switching frequency, to reduce loss and to realize a highly efficient compensation control device for a power system.

According to the first embodiment, in the compensation control device for the power system using the switched capacitor 100, there are provided the controllable voltage applying means 200 and the ganged control means 300 cooperating with the switched capacitor 100, with the effect that continuous controllability of the total impedance is realized, and the device capacitance of parts necessary for ganged control can be reduced.

(Second Embodiment)

Figure 4:
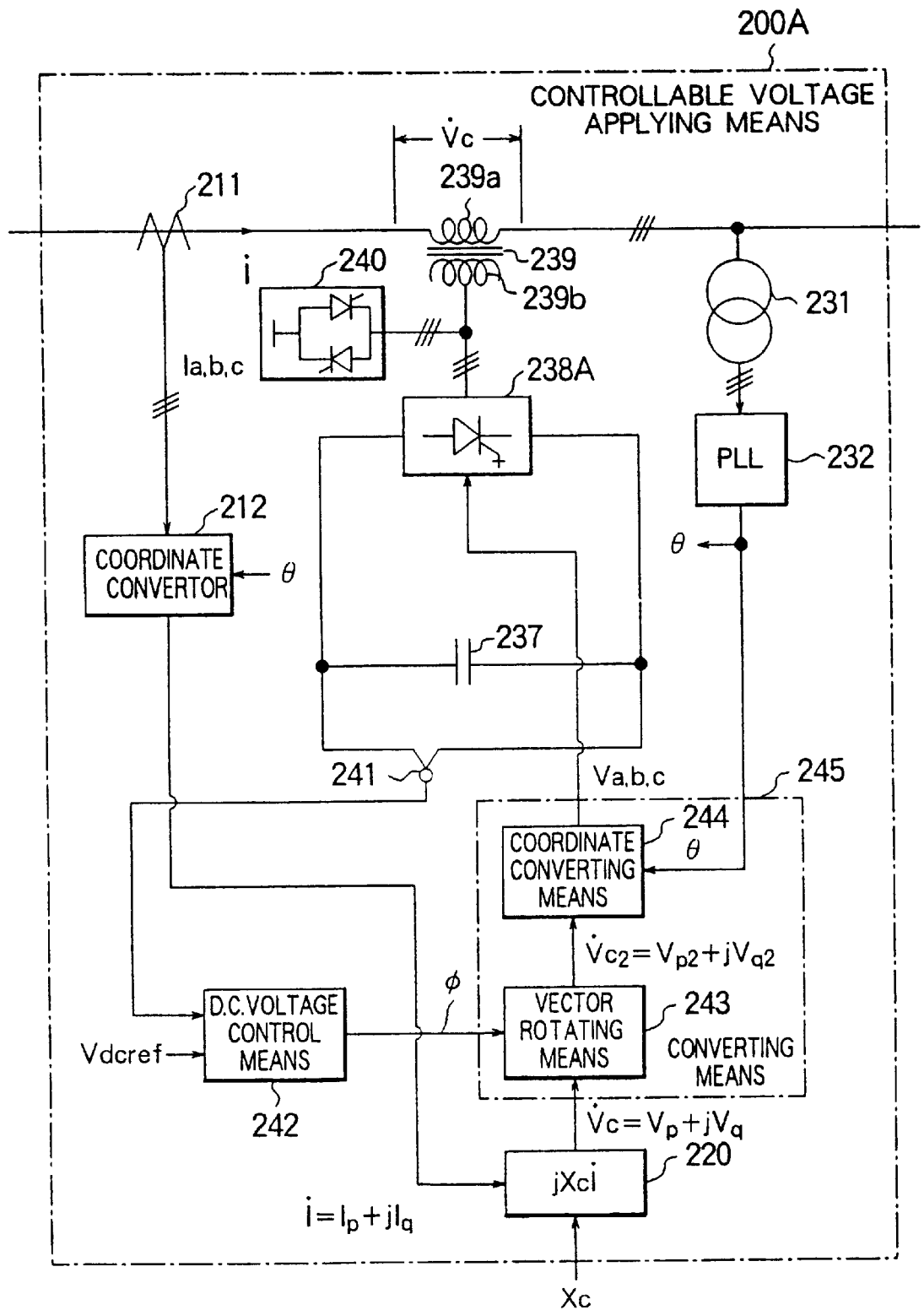
FIG. 4 is a diagram showing the structure of controllable voltage applying means in a compensation control device for a power system according to a second embodiment of the present invention.

A compensation control device for a power system according to a second embodiment of the present invention will be described with reference to FIG. 4. FIG. 4 is a diagram showing the detailed structure of controllable voltage applying means in a compensation control device for a power system according to the second embodiment of the present invention. Other structures are identical with those in the first embodiment.

In FIG. 4, the same symbols as those in FIG. 3 indicate identical or like parts. Also, in the figure, reference numeral 200A denotes controllable voltage applying means; 238A is a pulse width modulation (PWM) power convertor, a multi-phase static power convertor; 241 is d.c. voltage detecting means; 242 is d.c. voltage control means; 243 is vector rotating means; 244 is coordinate converting means for converting a synchronous rotation coordinate value to a fixed coordinate value; 245 is converting means including vector rotating means 243 and coordinate converting means 244.

The operation of the controllable voltage applying means 200A will be described. The d.c. voltage control means 242 compares and amplifies the d.c. voltage of the power convertor 238A detected by the d.c. voltage detecting means 241 with its command value Vdcref to produce a deviation angle $\phi$ for finely adjusting the phase of the a.c. output voltage to be generated. Upon receiving the voltage command vector Vc, which is an output by the control means 220, and the output $\phi$ of the d.c. voltage control means 242, the vector rotating means 243 makes the voltage command vector Vc rotate a slight angle $\phi$ to output a second voltage command vector Vc2 =(Vp2, Vq2).

Upon receiving the phase signal $\phi$ and the second voltage command vector Vc2, the coordinate converting means 244 produces the three-phase a.c. output voltage commands Va,b,c. The power convertor 238A generates an a.c. voltage proportional to the three-phase a.c. output voltage commands Va,b,c on the basis of those commands.

Since the above voltage command vector Vc is orthogonal to the current vector I, the effective power of the power convertor 238A is basically zero. However, for maintaining the d.c. voltage, slight power input and output need be controlled. For controlling the d.c. voltage, the second voltage command vector Vc2 is produced by slightly rotating the voltage command vector Vc forward or backward so that the power of the power convertor 238A, as well as a d.c. current mean value, is changed, to thereby control the d.c. voltage to a desired value.

In this situation, even if the vector rotating means 243 is deleted, and ($\theta+\phi$) obtained by adding a slight angle $\phi$ to the detection phase $\phi$ is inputted to the coordinate converting means 244, the same control operation and effect are obtained.

In addition, only a q-axis voltage component Vq needs to be changed by the output of the d.c. voltage control means 242.

The above structure realizes the function of the controllable voltage applying means in FIG. 1. In this case, the use of the PWM power convertor 238A improves the response speed of the impedance control. Therefore, the total capacitive reactance can be further smoothly controlled relative to the jumping of the reactance produced at the time of the on/off operation of the switched capacitor 100.

(Third Embodiment)

Figure 5:
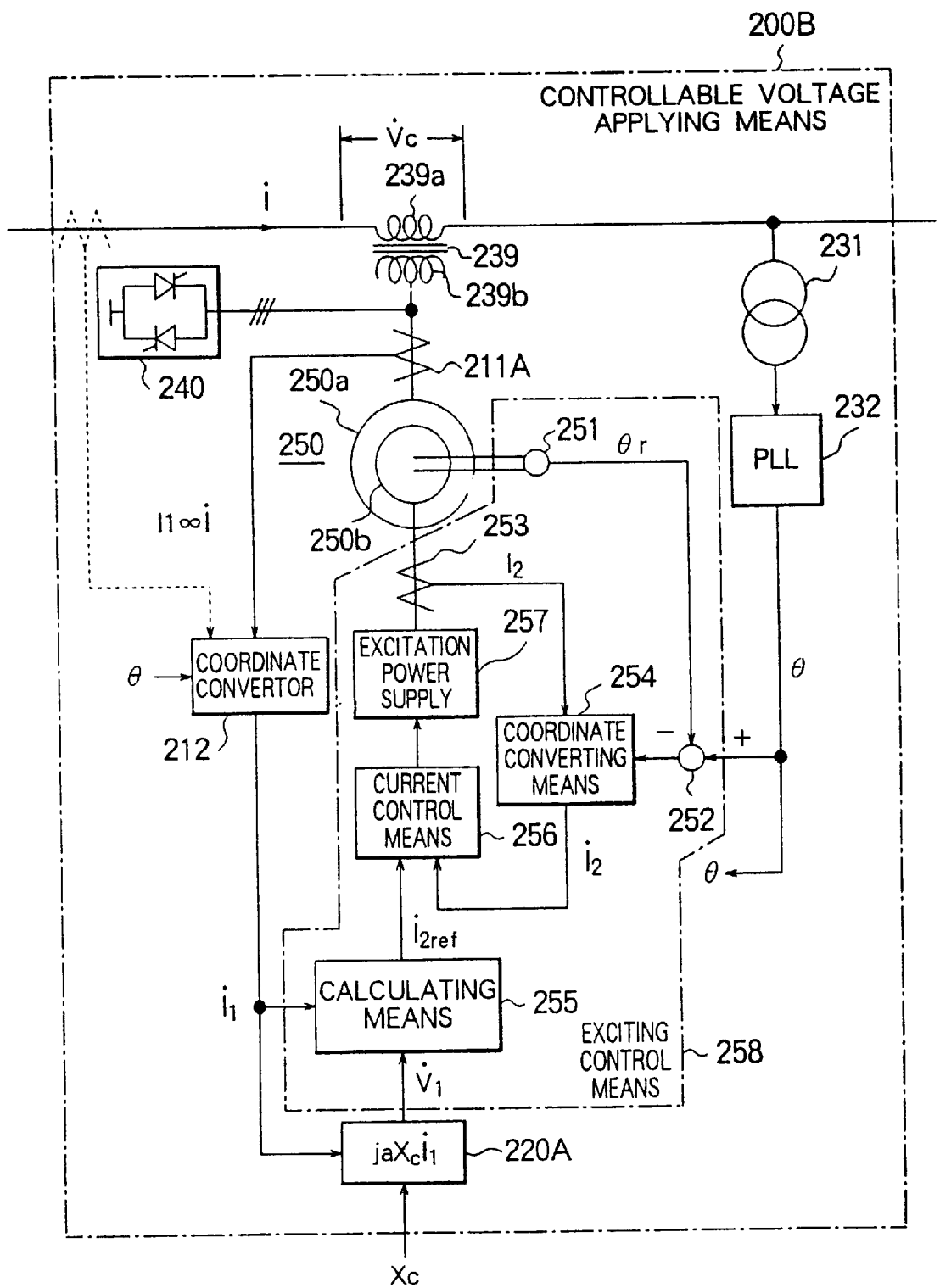
FIG. 5 is a diagram showing the structure of controllable voltage applying means in a compensation control device for a power system according to a third embodiment of the present invention.

A compensation control device for a power system according to a third embodiment of the present invention will be described with reference to FIG. 5. FIG. 5 is a diagram showing the detailed structure of controllable voltage applying means in a compensation control device for a power system according to the third embodiment of the present invention. Other structures are identical with those in the first embodiment.

In FIG. 5, the same reference symbols as those in FIG. 3 indicate the same or like parts. Also, in the figure, reference numeral 200B denotes controllable voltage applying means; 250 is a wound a.c. machine (non-synchronous machine) having a primary winding 250*a* and a secondary winding 250*b*; 251 is detecting means (electric angle conversion output) of a rotating angle θr; 252 is composing means (sum/difference operating means) for combining the phase θ and the mechanical rotating angle (electric angle) θr; 253 is detecting means for detecting a secondary current $I_2$ of the a.c. machine 250, and 254 is coordinate converting means that converts the secondary winding coordinate value into a synchronous rotating coordinate value.

Also, in the figure, reference numeral 255 denotes calculating means for arithmetically operating a secondary current command vector $I_{2ref}$ based on a primary current vector $I_1$ and a primary voltage command vector $V_1$ of the a.c. machine 250; 256 is current control means for controlling an excitation current vector $I_2$ supplied to the a.c. machine 250; 257 is an excitation power supply for the secondary winding 250*b*; and 258 is an exciting control means.

In addition, in the figure, reference numeral 211A denotes a current transformer that works also for detection of the transmission line current and detection of the primary winding current of the a.c. machine 250, utilizing the fact that the secondary current of the transformer 239 is proportional to the primary current I of the transformer 239 and equal to the primary current $I_1$ of the wound a.c. machine 250. The current transformer for directly detecting the transmission line current may be seperate, as indicated by a dotted line in the figure, similar to the previously described respective embodiments. Also, reference numeral 220A denotes control means for arithmetically applying an operation to a desired primary voltage vector $V_1$ from the desired reactance Xc and the primary current vector $I_1$ utilizing a proportional relation between the current vector $I_1$ and the line current vector I and a proportional relation between the primary voltage vector Vc of the transformer 239 and the primary voltage vector $V_1$ of the a.c. machine 250.

The operation of the controllable voltage applying means 200B will be described. The control means 220A multiplies a proportional factor "a", taking a transformation ratio of the transformer 239 into consideration to arithmetically determine the orthogonal voltage vector $V_1$ with respect to the current vector $I_1$. The calculating means 255 outputs the secondary current command vector $I_{2ref}$ through the arithmetic operation of Expression (1). Assuming that the lateral alignment is in rows, and the longitudinal alignment is in columns, a matrix of 2 rows and 1 column (column vector) is represented by $[a_{11}/a_{21}]$, and a square matrix of 2 rows and 2 columns is represented by $[a_{11}, a_{12}/a_{21}, a_{22}]$.

$$[I_{2rfed}/I_{2refq}]=(1/\omega M)[0, 1/-1, 0][V_{1d}/V_{1q}]+(L_1+L_t/M)[I_{1d}/I_{1q}] \quad (1)$$

In Expression (1), $I_{2rued}$ and $I_{2refq}$ are components of the secondary current command vector $I_{2ref}$, and $V_{1d}$ and $V_{1q}$ are components of the desired primary voltage vector $V_1$, $I_{1d}$ and $I_{1g}$ are components of the primary current vector $I_1$, $\omega$ is the electric angular frequency of the power system, M is the mutual inductance between the primary and secondary sides of the a.c. machine 250, $L_1$ is the primary inductance of the a.c. machine 250, and $L_t$ is the leakage inductance of the transformer 239.

With the above relation, when the secondary current flows, a desired primary voltage $V_1$ is developed as the characteristic of the a.c. machine 250. The secondary current command and the secondary current $I_2$ are compared and amplified by the current control means 256 to provide feedback control of the excitation power supply 257. As a result, the primary voltage $V_1$ and the impressed voltage Vc from the primary winding 250a of the transformer are controlled to desired values.

In addition, the equivalent impedance given to the transmission line by the controllable voltage applying means 200B becomes a desired Xc. Thus, the function of the controllable voltage applying means in FIG. 1 is realized.

The third embodiment has an effect that the generation of a short-period effective power can be absorbed utilizing a rotational inertia in addition to the reactive power. Also, there is an effect that the over-current withstand is as the controllable voltage applying means 200B, increased more than using the static type power convertor.

(Fourth Embodiment)

Figure 6:
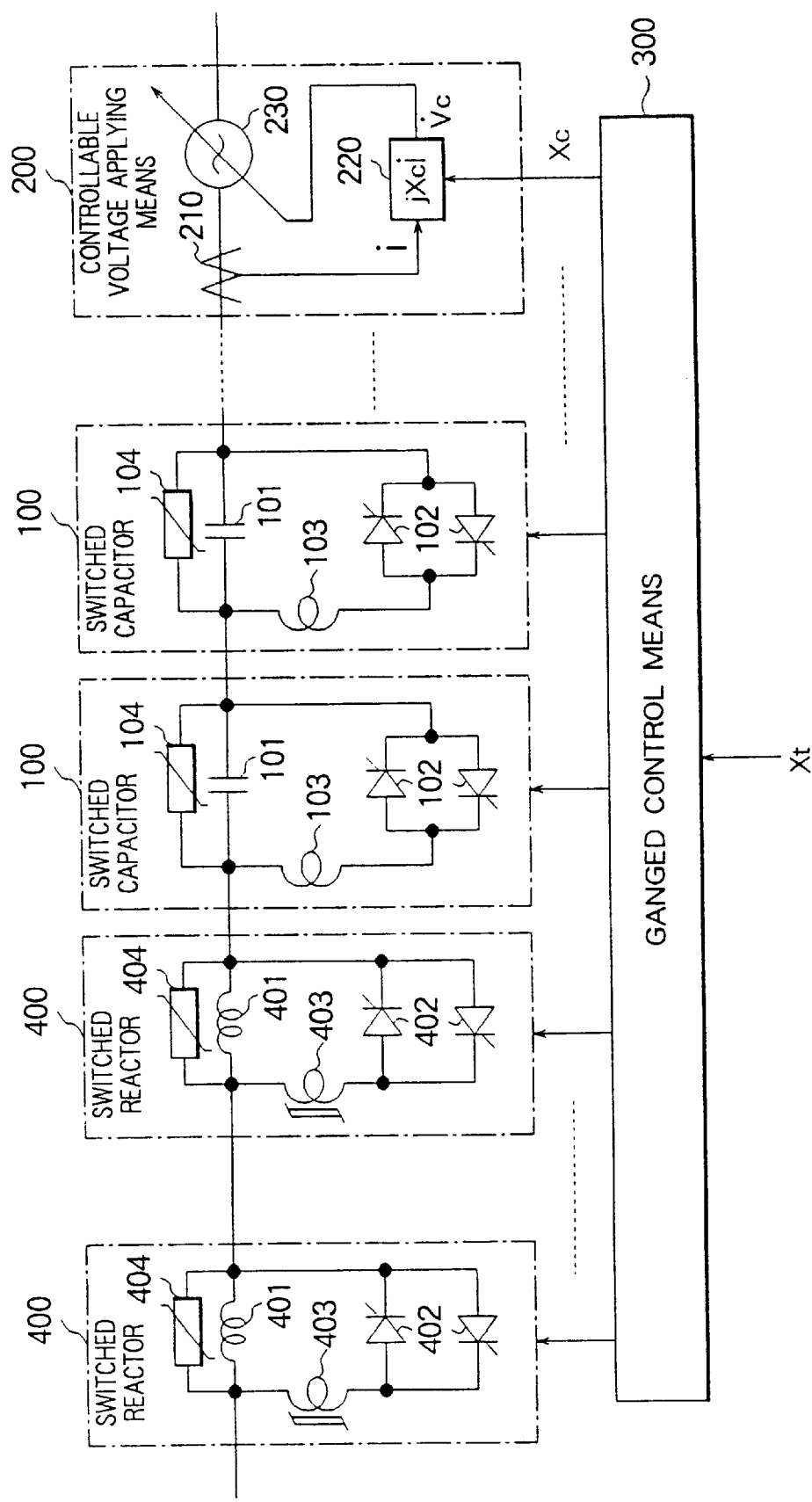
FIG. 6 is a diagram showing the structure of a compensation control device for a power system according to a fourth embodiment of the present invention.
Figure 7A:
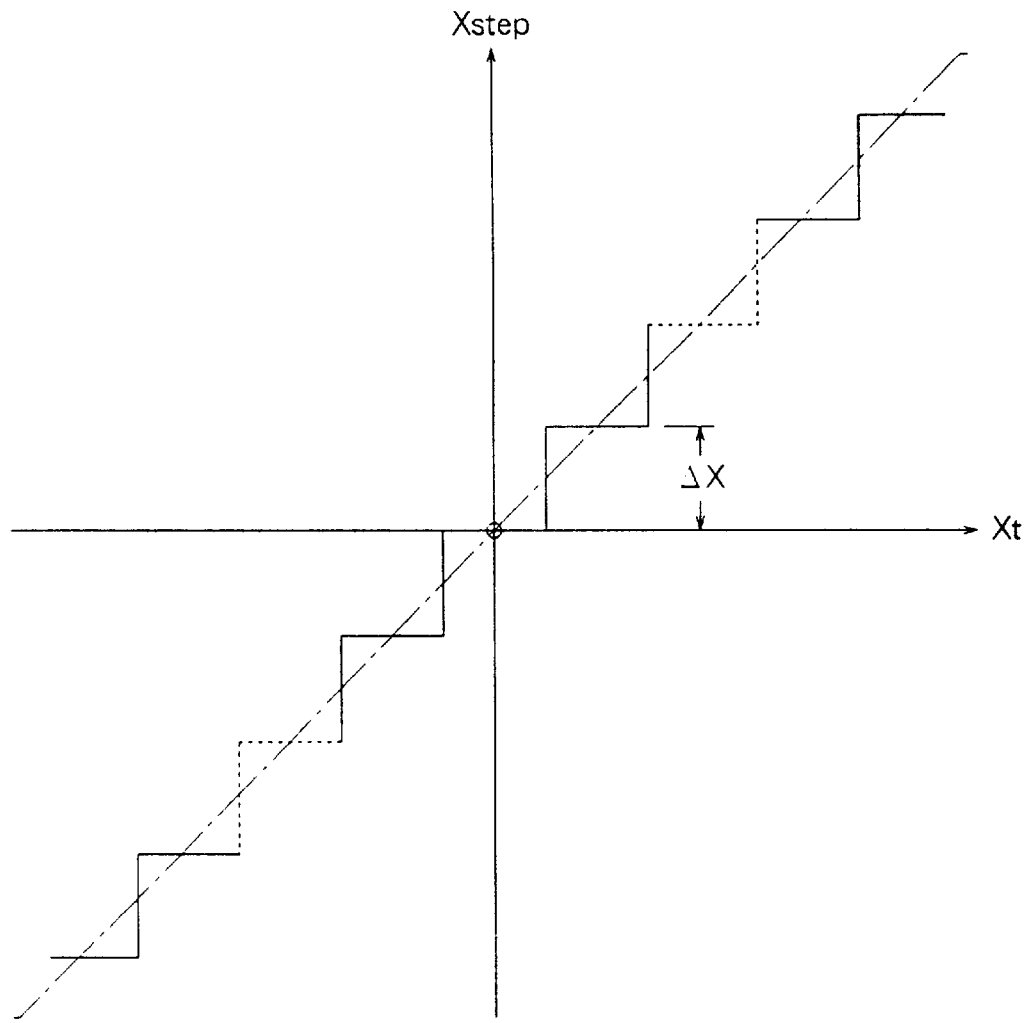
FIGS. 7A and 7B are diagrams showing a relation between a capacitive reactive reactance Xstep and a desired total reactance Xt in the compensation control device for a power system according to the fourth embodiment of the present invention, and a relation between a controllable reactance Xc and a total reactance Xt in the controlling device, respectively.
Figure 7B:
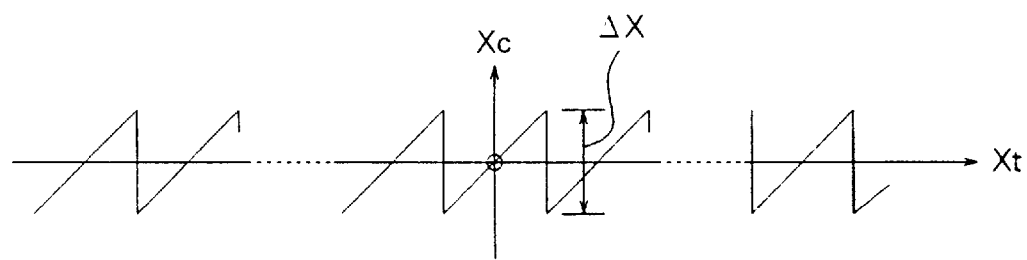
Figure 8B:
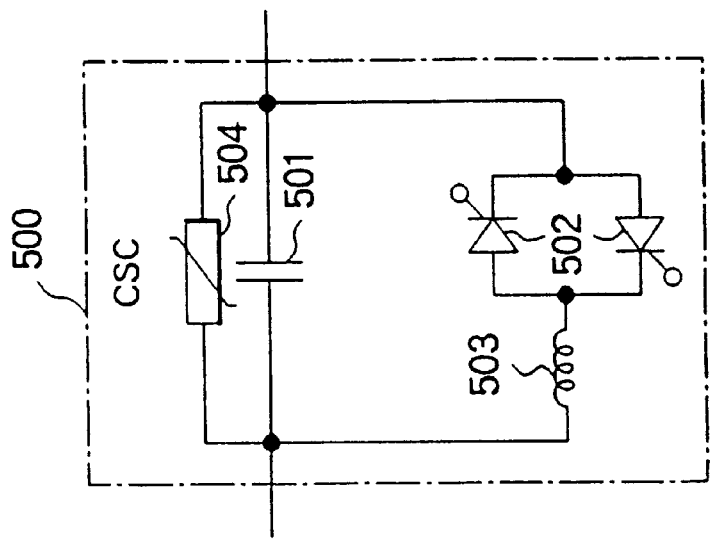
FIGS. 8A and 8B are diagrams showing the structures of a conventional compensation control devices for a power system.
Figure 8A:
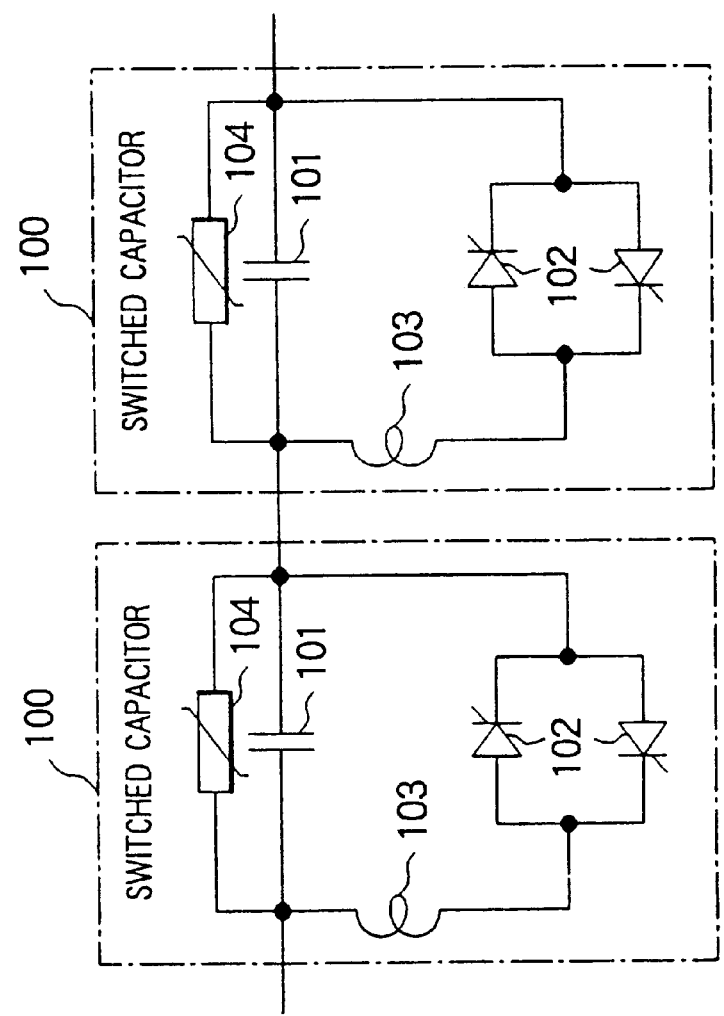
Figure 9A:
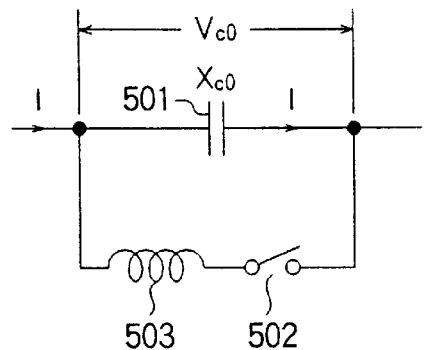
FIGS. 9A, 9B and 9C are diagrams showing an equivalent circuit of a CSC in a conventional compensation control device for a power system.
Figure 9B:
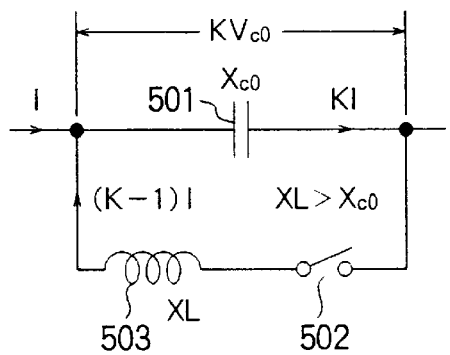
Figure 9C:
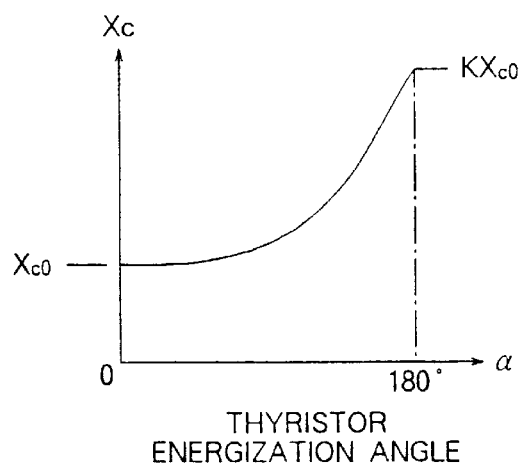

A compensation control device for a power system according to a fourth embodiment of the present invention will be described with reference to FIGS. 6 and 7A, 7B. FIG. 6 is a diagram showing the structure of a compensation control device for a power system according to the fourth embodiment of the present invention. FIGS. 7A and 7B are diagrams showing a relation between a capacitive reactance Xstep and a desired total reactance Xt in the compensation control device for a power system according to the fourth embodiment of the present invention, and a relation between a controllable capacitive reactance Xc and a total capacitive reactance Xt in the controlling device, respectively.

In FIG. 6, reference numeral 100 denotes a switched capacitor; 200 is controllable voltage applying means; 300 is ganged control means; and 400 is a switched reactor.

In the figure, the controllable voltage applying means 200 may be the controllable voltage applying means in the respective embodiments shown in FIGS. 3, 4 and 5. With this structure, this embodiment is identical with the other embodiments in that the total reactance can be continuously controlled. In the fourth embodiment, there are provided a single or plural switched reactors 400, each being including a reactor 401, individual switch means 402, such as a thyristor switch, an anode reactor 403 such as an oversaturated reactor, and an arrester 404. In addition, a single or plural switched capacitors 100 are provided. Ganged control means 300 is also provided.

The absolute value of the reactance of the reactor 404 is selected so as to be substantially equal to the absolute value of the reactance of the capacitor 101 as ΔX. In this fourth embodiment, the switched capacitors 100 and the switched reactor 400 make it possible to change the reactance over both regions of the reactive reactance to the capacitive reactance step by step.

The reactance Xstep, which is changed step by step is changed with respect to the desired total reactance Xt as indicated by a solid line of FIG. 7A. On the other hand, the controllable voltage applying means 200 permits an Xc that changes in the form of a saw-tooth with respect to the desired total reactance Xt to be produced. This relation is shown in FIG. 7B. As a result, when the total reactance is (Xstep+Xc), Xc can be continuously changed with respect to Xt as indicated by a dashed line in FIG. 7A.

The anode reactor 403 is designed to prevent the arrester 404 from turning on the thyristor switch 402 during energization, the arrester current rapidly flows to the thyristor side so that the current change ratio di/dt exceeds the limit of the turn-on di/dt of the thyristor switch 402, and also prevents the device withstand.

In the fourth embodiment, the reactive region can also be covered. Also, it can be operated in the vicinity of zero impedance during normal operation. For example, for the purpose of improving the transition stability to the existing power system, the power system is operated under the same condition as if the present invention is not provided, as in the conventional example, and the impedance control is conducted by the device of the present invention for only the short period necessary for transition stabilization at the time of a failure, so that the stabilizing performance of the power system can be exhibited. In addition, since the variable range is wide, there is an advantage that the device of the present invention can be widely used.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A compensation control device for a power system comprising:

a switched capacitor connected in series with a transmission line for producing a stepped voltage increasing in stepped increments for application to the transmission line;

a switched reactor connected in series with the transmission line;

controllable voltage applying means connected in series with the transmission line for producing a linearizing voltage for application to the transmission line; and ganged control means for controlling on/off operation of said switched capacitor and said switched reactor, and controlling the linearizing voltage generated by said controllable voltage applying means in association with control of the on/off operation of said switched capacitor and said switched reactor so that a sum voltage of the stepped voltage across said switched capacitor and said switched reactor and the linearizing voltage of said controllable voltage applying means, for application to the transmission line, varies continuously.

2. The compensation control device for a power system according to claim 1, wherein said controllable voltage applying means comprises:
   detecting means for detecting a current vector of a current flowing in the transmission line; and
   control means for generating a first voltage command orthogonal to the current vector to achieve a desired reactance, said controllable voltage applying means generating the linearizing voltage to be proportional to the first voltage command.

3. The compensation control device for a power system according to claim 1, wherein said controllable voltage applying means comprises:
   detecting means for detecting a current vector of a current flowing in the transmission line; and
   control means for generating a first voltage command orthogonal to the current vector to achieve a desired voltage, said controllable voltage applying means generating the linearizing voltage to be proportional to the first voltage command.

4. The compensation control device for a power system according to claim 2, wherein
   said controllable voltage applying means comprises:
      a voltage transformer for detecting a voltage across the transmission line; and
      a phase detector for detecting phase of the voltage detected by said voltage transformer; and
   said detecting means comprises:
      a current transformer for detecting the current flowing in the transmission; and
      a first coordinate converter for converting a current vector of the current detected by said current transformer into a current vector having a synchronously rotating coordinate value.

5. The compensation control device for a power system according to claim 4, wherein said controllable voltage applying means comprises:
   phase command means for arithmetically determining a deviation angle of the voltage command and outputting the deviation angle;
   an adder for adding the deviation angle to the phase detected by said phase detector to output a sum signal controlling the phase of an a.c. voltage produced by said controllable voltage applying means;
   d.c. voltage command means for arithmetically operating on the absolute value of the first voltage command to control the absolute value of the a.c. voltage produced by said controllable voltage applying means;
   an adjustable d.c. power supply producing a d.c. voltage controlled in response to the absolute value of the first voltage command; and
   an amplitude modulation power converter applying to the transmission line an a.c. voltage generated in response to the sum signal and the d.c. voltage produced by said adjustable d.c. power supply.

6. The compensation control device for a power system according to claim 4, wherein said controllable voltage applying means comprises:
   a DC/AC power convertor;
   d.c. voltage control means for controlling a d.c. voltage produced by said DC/AC power convertor in response to a comparison of the d.c. voltage produced by said DC/AC power convertor and a command value;
   converting means including vector rotating means and coordinate converting means for generating a second voltage command in response to, respectively, the first voltage command and a deviation angle obtained from said d.c. voltage control means and for generating a three-phase a.c. voltage command in response to the phase detected by said phase detector and the second voltage command produced by said vector rotating means; and
   a pulse width modulation power convertor that applies the a.c. voltage generated in response to the three-phase a.c. voltage command produced by said coordinate converting means to the transmission line through said transformer.

7. The compensation control device for a power system according to claim 1, wherein said controllable voltage applying means includes an asynchronous rotating machine with a wound rotor, said asynchronous rotating machine supplying an a.c. voltage, controlled by a command from said ganged control means, to the transmission line.

8. A compensation control device for a power system comprising:
   a switched capacitor connected in series with a transmission line for producing a stepped voltage increasing in stepped increments for application to the transmission line;
   controllable voltage applying means connected in series with the transmission line for producing a linearizing voltage for application to the transmission line, said controllable voltage applying means comprising:
      a current transformer for detecting current flowing in the transmission line;
      first coordinate converting means for converting the current detected by said current transformer into a current vector having a synchronously rotating coordinate value;
      control means for generating a first voltage command, orthogonal to the current vector, based on a desired reactance of the transmission line; and
      a controllable power supply for generating a voltage proportional to the first voltage command, said controllable power supply including
         a voltage transformer for detecting a voltage on the transmission line;
         a phase detector for detecting phase of the voltage detected by said voltage transformer;
         a pulse width modulation power converter for generating an a.c. voltage applied through a transformer to the transmission line for compensating the power system;
         a DC/AC power converter for generating a DC voltage indicative of the a.c. voltage across said pulse width modulation power converter supplying power to the transmission line;
         d.c. voltage control means for adjusting the phase of the a.c. voltage across said pulse width modulation power converter by comparing the DC voltage produced by said DC/AC power converter to a command value, and, in response, producing a deviation angle;
         vector rotating means, receiving the deviation angle generated by said d.c. voltage control means and the first voltage command, for generating a second voltage command rotated relative to the first voltage command by the deviation angle;
         second coordinate converting means for generating a three phase a.c. voltage command applied to said pulse width modulation power converter in response to the phase detected by said phase detector and the second voltage command produced by said vector rotation means; and
   ganged control means for controlling on/off operation of said switched capacitor, and controlling the linearizing voltage generated by said controllable voltage means in association with control of the on/off operation of said switched capacitor so that a sum voltage of the stepped voltage across said switched capacitor and the linearizing voltage of said controllable voltage applying means, for application to the transmission line, varies continuously.

9. A compensation control device for a power system comprising:

a switched capacitor connected in series with a transmission line for producing a stepped voltage increasing in stepped increments for application to the transmission line;

controllable voltage applying means connected in series with the transmission line for producing a linearizing voltage for application to the transmission line, said controllable voltage applying means comprising:

a current transformer for detecting current flowing in the transmission line;

first coordinate converting means for converting the current detected by said current transformer into a current vector having a synchronously rotating coordinate value;

control means for generating a voltage command, orthogonal to the current vector, based on a desired reactance of the transmission line; and a controllable power supply for generating a voltage proportional to the voltage command and including a voltage transformer for detecting a voltage on the transmission line;

a phase detector for detecting phase of the voltage detected by said voltage transformer;

an asynchronous rotating machine, having a primary winding and a secondary winding, for generating an a.c. voltage applied through a transformer to the transmission line for compensating the power system;

detecting means for detecting a rotational angle of said asynchronous rotating machine;

means for combining the rotational angle and the phase detected by said phase detector;

current detecting means for detecting a secondary current flowing in the secondary winding of said asynchronous rotating machine;

second coordinate converting means receiving the secondary current detected by said current detecting means and an output produced by said means for combining, for producing a converted secondary current;

calculating means receiving the voltage command and the current vector, for generating, in response, a secondary current command vector;

current control means for generating an excitation current vector in response to the secondary current command vector and the converted secondary current;

an excitation power supply supplying an excitation current to the secondary winding of said asynchronous rotating machine in response to the excitation current vector supplied by said current control means; and ganged control means for controlling on/off operation of said switched capacitor, and controlling the linearizing voltage generated by said controllable voltage means in association with control of the on/off operation of said switched capacitor so that a sum voltage of the stepped voltage across said switched capacitor and the linearizing voltage of said controllable voltage applying means, for application to the transmission line, varies continuously.

10. The compensation control device for a power system according to claim 9, wherein said controllable voltage applying means comprises:

detecting means for detecting a current vector of a current flowing in the transmission line; and control means for generating a first voltage command orthogonal to the current vector to achieve a desired reactance, said controllable voltage applying means generating the linearizing voltage to be proportional to the first voltage command.

11. The compensation control device for a power system according to claim 9, wherein said controllable voltage applying means comprises:

detecting means for detecting a current vector of a current flowing in the transmission line; and control means for generating a first voltage command orthogonal to the current vector to achieve a desired voltage, said controllable voltage applying means generating the linearizing voltage to be proportional to the first voltage command.

12. A compensation control device for a power system comprising:

a switched capacitor connected in series with a transmission line for producing a stepped voltage increasing in stepped increments for application to the transmission line;

controllable voltage applying means connected in series with the transmission line for producing a linearizing voltage for application to the transmission line; and ganged control means for controlling on/off operation of said switched capacitor, and controlling the linearizing voltage generated by said controllable voltage applying means in association with control of the on/off operation of said switched capacitor and said switched reactor so that a sum voltage of the stepped voltage across said switched capacitor and said switched reactor and the linearizing voltage of said controllable voltage applying means, for application to the transmission line, varies continuously.

13. The compensation control device for a power system according to claim 12, wherein said controllable voltage applying means comprises:

detecting means for detecting a current vector of a current flowing in the transmission line; and control means for generating a first voltage command orthogonal to the current vector to achieve a desired reactance, said controllable voltage applying means generating the linearizing voltage to be proportional to the first voltage command.

14. The compensation control device for a power system according to claim 12, wherein said controllable voltage applying means includes an asynchronous rotating machine with a wound rotor, said asynchronous rotating machine supplying an a.c. voltage, controlled by a command from said ganged control means, to the transmission line.

15. The compensation control device for a power system according to claim 12, wherein said controllable voltage applying means comprises:

detecting means for detecting a current vector of a current flowing in the transmission line; and control means for generating a first voltage command orthogonal to the current vector to achieve a desired voltage, said controllable voltage applying means generating the linearizing voltage to be proportional to the first voltage command.

* * * * *